(12) United States Patent
Ishikawa et al.

(10) Patent No.: US 7,255,908 B2
(45) Date of Patent: Aug. 14, 2007

(54) MAGNETIC TAPE

(75) Inventors: Akira Ishikawa, Tochigi (JP); Takashi Ishii, Tochigi (JP); Mitsuhiro Katashima, Tochigi (JP); Manabu Hosoya, Tochigi (JP); Tomohiko Onda, Tochigi (JP)

(73) Assignee: Quantum Corporation, San Jose, CA (US)

( * ) Notice: Subject to any disclaimer, the term of this patent is extended or adjusted under 35 U.S.C. 154(b) by 357 days.

(21) Appl. No.: 10/686,502

(22) Filed: Oct. 14, 2003

(65) Prior Publication Data

US 2004/0258961 A1 Dec. 23, 2004

Related U.S. Application Data

(63) Continuation of application No. 10/341,739, filed on Jan. 14, 2003, now abandoned, and a continuation of application No. 10/170,830, filed on Jun. 13, 2002, now abandoned, and a continuation of application No. 09/530,005, filed on Jul. 21, 2000, now abandoned.

(51) Int. Cl.
*G11B 5/735* (2006.01)

(52) U.S. Cl. ..................................... 428/141

(58) Field of Classification Search ............... 428/141, 428/328, 329, 694 BB
See application file for complete search history.

(56) References Cited

U.S. PATENT DOCUMENTS 3,916,039 A * 10/1975 Akashi et al. ............... 427/128

| | | |
|---|---|---|
| 4,123,788 A | 10/1978 | Kruger |
| 4,176,381 A | 11/1979 | De Niet et al. |
| 4,275,425 A | 6/1981 | Watanabe et al. |
| 4,340,305 A | 7/1982 | Smith et al. |
| 4,380,032 A | 4/1983 | Pfost |
| 4,558,383 A | 12/1985 | Johnson |
| 4,570,191 A | 2/1986 | Di Stefano et al. |
| 4,578,311 A | 3/1986 | Ishikuro et al. |
| 4,626,469 A | 12/1986 | Yamaguchi et al. |
| 4,633,451 A | 12/1986 | Ahn et al. |
| 4,737,877 A | 4/1988 | Krongelb et al. |
| 4,746,542 A | 5/1988 | Chino et al. |
| 4,816,939 A | 3/1989 | Ford et al. |
| 4,816,941 A | 3/1989 | Edel et al. |

(Continued)

FOREIGN PATENT DOCUMENTS

DE 34 17 426 A1 11/1985

(Continued)

OTHER PUBLICATIONS

Hart, D., "Optical Servo Technique Using Moire Fringes," *IBM Technical Disclosure Bulletin*, vol. 16, No. 9 (Feb. 1974) at p. 3020.

(Continued)

*Primary Examiner*—Carol Chaney
*Assistant Examiner*—Gary Harris
(74) *Attorney, Agent, or Firm*—Morrison & Foerster LLP

(57) ABSTRACT

A magnetic tape (1) characterized by having a backcoating layer (5) which comprises a binder and fine particles having been dispersed in the binder and being capable of irreversibly changing in color on oxidation reaction, and has a sufficient number of microvoids of sufficient size to supply sufficient oxygen to cause the oxidation reaction.

16 Claims, 3 Drawing Sheets

U.S. PATENT DOCUMENTS

| | | | |
|---|---|---|---|
| 4,843,494 A | 6/1989 | Cronin et al. | |
| 4,848,698 A | 7/1989 | Newell et al. | |
| 4,868,046 A | 9/1989 | Morizumi et al. | |
| 4,884,260 A | 11/1989 | Bouldin et al. | |
| 4,935,835 A | 6/1990 | Godwin et al. | |
| 4,958,245 A | 9/1990 | Roth et al. | |
| 4,961,123 A | 10/1990 | Williams | |
| 4,969,058 A | 11/1990 | Williams | |
| 5,016,240 A | 5/1991 | Strandjord et al. | |
| 5,038,030 A | 8/1991 | Hayashi et al. | |
| 5,050,017 A | 9/1991 | Carr | |
| 5,065,387 A | 11/1991 | Roth et al. | |
| 5,067,039 A | 11/1991 | Godwin et al. | |
| 5,120,927 A | 6/1992 | Williams et al. | |
| 5,121,371 A | 6/1992 | Farnsworth | |
| 5,196,969 A | 3/1993 | Iwamatsu et al. | |
| 5,218,595 A | 6/1993 | Lehureau et al. | |
| 5,262,908 A | 11/1993 | Iwamatsu et al. | |
| 5,283,773 A | 2/1994 | Thomas | |
| 5,319,507 A | 6/1994 | Umebayashi et al. | |
| 5,349,484 A | 9/1994 | Koehler | |
| 5,414,585 A | 5/1995 | Saliba | |
| 5,430,594 A | 7/1995 | Umebayashi et al. | |
| 5,450,257 A | 9/1995 | Tran | |
| 5,462,823 A | 10/1995 | Evans et al. | |
| 5,501,944 A | 3/1996 | Hill | |
| 5,510,140 A | 4/1996 | Kurose et al. | |
| 5,515,212 A | 5/1996 | Chiao | |
| 5,523,904 A | 6/1996 | Saliba | |
| 5,532,042 A | 7/1996 | Kawarai et al. | |
| 5,535,069 A | 7/1996 | Chiao | |
| 5,535,190 A | 7/1996 | Moore et al. | |
| 5,563,868 A | 10/1996 | Farnsworth | |
| 5,566,033 A | 10/1996 | Frame et al. | |
| 5,589,247 A | 12/1996 | Wallack et al. | |
| 5,674,583 A | 10/1997 | Nakayama et al. | |
| 5,696,755 A | 12/1997 | Leonhardt | |
| 5,705,268 A | 1/1998 | Ishikawa et al. | |
| 5,718,964 A | 2/1998 | Naoe et al. | |
| 5,877,910 A | 3/1999 | Williams | |
| 6,033,752 A | 3/2000 | Suzuki et al. | |
| 6,063,489 A | 5/2000 | Kobayashi et al. | |
| 6,075,678 A | 6/2000 | Saliba | |
| 6,084,740 A | 7/2000 | Leonhardt et al. | |
| 6,103,365 A * | 8/2000 | Ishii et al. | 428/332 |
| 6,108,434 A | 8/2000 | Cox et al. | |
| 6,236,529 B1 | 5/2001 | Leonhardt et al. | |
| 6,246,535 B1 | 6/2001 | Saliba et al. | |
| 6,549,363 B2 | 4/2003 | Leonhardt et al. | |
| 6,606,220 B1 * | 8/2003 | Glatfelter et al. | 360/134 |
| 6,661,610 B1 * | 12/2003 | Iwasaki | 360/134 |
| 6,741,415 B1 * | 5/2004 | Okuda et al. | 360/75 |
| 6,768,608 B2 * | 7/2004 | Saliba et al. | 360/77.03 |
| 6,771,450 B1 * | 8/2004 | Okuda et al. | 360/75 |
| 6,818,298 B2 * | 11/2004 | Lowery et al. | 428/403 |
| 6,914,254 B2 * | 7/2005 | Iwasaki | 250/559.01 |
| 6,940,676 B1 * | 9/2005 | Lee et al. | 360/72.1 |
| 6,940,681 B2 * | 9/2005 | Bellesis et al. | 360/77.12 |
| 6,980,390 B2 * | 12/2005 | Saliba | 360/77.12 |
| 7,023,650 B2 * | 4/2006 | Basra et al. | 360/77.12 |
| 7,029,726 B1 * | 4/2006 | Chen et al. | 427/555 |
| 7,110,210 B2 * | 9/2006 | Saliba et al. | 360/77.12 |
| 7,153,366 B1 * | 12/2006 | Chen et al. | 118/620 |
| 7,163,714 B2 * | 1/2007 | Lowery et al. | 427/127 |

FOREIGN PATENT DOCUMENTS

| | | | |
|---|---|---|---|
| EP | 0 311 859 A2 | 4/1989 | |
| EP | 0 434 230 A2 | 6/1991 | |
| EP | 0 496 461 A1 | 7/1992 | |
| EP | 0 549 845 A1 | 7/1993 | |
| EP | 0 555 511 A1 | 8/1993 | |
| EP | 0564187 | 10/1993 | |
| GB | 1 595 136 | 8/1981 | |
| JP | 56-111169 | 9/1981 | |
| JP | 57-120230 | 7/1982 | |
| JP | 57-120255 | 7/1982 | |
| JP | 61-142530 | * | 6/1986 |
| JP | H1-311433 | 12/1989 | |
| JP | H4-38632 | 2/1992 | |
| JP | 06020414 A | 1/1994 | |
| JP | 06243619 A | 9/1994 | |
| JP | 07-65434 | 3/1995 | |
| JP | 07-220255 | 8/1995 | |
| JP | 07-082626 | 9/1995 | |
| JP | 08-174669 | 7/1996 | |
| JP | 09-265626 | 10/1997 | |
| JP | 09/289885 | 10/1997 | |
| JP | 09/337733 | 11/1997 | |
| WO | WO 94/12975 | 6/1994 | |

OTHER PUBLICATIONS

Aviram, A., et al., "Optical Recording of Servo Pattern on Magnetic Disks," *IBM Technical Disclosure Bulletin*, vol. 27, No. 7A (Dec. 1984) at pp. 3994-3995.

Acosta, R.E., et al., "Floppy Disk Embossing for Servo Applications," *IBM Technical Disclosure Bulletin*, vol. 21 No. 10 (Mar. 1979) at pp. 4259-4260.

Schneider, J., Optical Servo Information on Magnetic Disks, *IBM Technical Disclosure Bulletin*, vol. 16 No. 4 (Sep. 1973) at p. 1082.

Hoagland, A., "Optical Servo of Magnetic Recording," *IBM Technical Disclosure Bulletin*, vol. 20 No. 10 (Mar. 1978) at pp. 4108-4109.

Farnsworth, S., et al., "Diffractive Optical System for Tracking on Floptical® Disks," proceedings of SPIE Conference on *Design of Optical Instruments*, SPIE vol. 1690 (1992) at pp. 72-79.

Koshino, N., et al., "Optical Method of the Head Positioning in Magnetic Disk Systems," *IEEE Transactions on Magnetics*, vol. MAG-16, No. 5 (Sep. 1980) at pp. 631-633.

Bartolini, R.A., et al., "Review and Analysis of Optical Recording Media," from Optical Engineering, vol. 15(2), pp. 99-108, reprinted in *Selected Papers on Optical Storage* (SPIE 1992) at 488-497.

Bartolini, R.A., et al., "Optical Disk Systems Emerge," IEEE Spectrum (Aug. 1978) pp. 20-28, reprinted in *Selected Papers on Optical Storage* (SPIE 1992) at 507-515.

Mendez, J., "A Unified Theory for WORM Media Modeling," in Proceedings of SPIE, vol. 899, *Optical Storage Technology & Applications* (1988) at 244-252, describes a variety of laser recordable WORM media.

Haskal, H., "Dynamics of pit formation in ablative optical recording," in Proceedings of SPIE, vol. 382, *Optical Data Storage* (1983) at pp. 174-181.

Shepherd, J., "Organic optical storage media for short wavelength systems," in Proceedings of SPIE, vol. 899, *Optical Storage Technology & Applications* (1988).

Unno Y., et al., "Development of optical recording disk and devices," in Proceedings of SPIE, vol. 382, *Optical Data Storage* (1983) at pp. 32-38.

Howe, G., et al., "Digital optical recording in infrared-sensitive organic polymers," in Proceedings of SPIE, vol. 382, *Optical Data Storage* (1983) at pp. 103-115.

Chen M., et al., "Two-regime ablative hole formation process in tellurium and tellurium-alloy films," in Proceedings of SPIE, vol. 382, *Optical Data Storage* (1983) at pp. 182-187.

Lee W., et al., "Stability of thin Te and Te-alloy films for optical data storage," in Proceedings of SPIE, vol. 382, *Optical Data Storage* (1983) at pp. 282-289.

Oakley, W., "A Novel Digital Optical Tape Recorder," in Proceedings of SPIE Conference on *High-Density Data Recording and Retrieval Technologies* (SPIE vol. 2604, 1996) pp. 256-262 (describes use of Kodak phase change optical tape).

Gelbart D., "An Optical Tape Recorder Using Linear Scanning," in Proceedings of SPIE Conference on *Optical Data Storage* (SPIE vol. 1316 1990) at pp. 65-68 (describes use of optical tape from Imperial Chemical Inc.).

Larsen, T., et al., "A New Tape Product for Optical Data Storage," in Japan J. Appl. Physics, vol. 32 (Nov. 1993) at 5461-5462. [QUANT024358-024359].

Thomas, F., Manufacture of 21 MB Floptical® disk using acousto-optically controlled laser ablation process, SPIE Conference on *Lasers as Tools for Manufacture* (SPIE vol. 2062) at pp. 113-124.

Uijen, C.M.J. "Reversible Optical Recording: phase-change media and magneto optics," in Proceedings of SPIE Conference on Optical Mass Data Storage (SPIE vol. 529) (1985) at pp. 2-5.

Mathur P., "Survey of Digital Tape Transport Servo Systems," in Proceedings of SPIE Conference on High-Density Data Recording and Retrieval Technologies (SPIE vol. 2604) (1995) at pp. 210-217.

Strandjord, A., "Flexible Storage Medium for Write-Once Optical Tape," in Proceedings of SPIE Optical Data Storage (SPIE vol. 1663) (1992) at pp. 362-371.

Lind, M.A.., "Performance of a Reversible Dye-Polymer Optical Recording Medium," in Proceedings of SPIE Conference on Optical Storage Technology and Applications (SPIE vol. 899) (1988) at pp. 211-218.

Leibbrandt, G.W.R., "Optical Tape System; Evaluation of Recorder and Media," in Proceedings of SPIE Conference on Optical Data Storage '97 (SPIE vol. 3109) (1997) at pp. 106-115.

Narahara, T., "Tracking Method of Optical Tape Recorder Using Acousto-Optic Scanning," in Proceedings of SPIE on Optical Data Storage '91 (SPIE vol. 1499) (1991) at pp. 120-128.

Eaton, J., "Magnetic Tape Trends and Futures," in Proceedings of SPIE on High-Density Data Recording and Retrieval Technologies (SPIE vol. 2604) (1995) at pp. 146-157.

Godwin, J., "An Introduction to the Insite 325 FLOPTICAL® Disk Drive," in Proceedings of SPIE on Optical Data Storage Topical Meeting (vol. 1078) (1989) at pp. 71-80.

Brock, P., "Generation of Optical Disk Servo Patterns by Lithographic Imaging of Photodeformable Polymers," in Proceedings of SPIE on Optical Data Storage (vol. 1316) (1990) at pp. 180-191.

Briggs, J., "Enabling Technologies for a 100MB 3.5" Floppy (ZIP™) Disk Drive," in Proceedings of SPIE on High-Density Data Recording and Retrieval Technologies (vol. 2604) (1995) at pp. 220-227.

Answer, Counterclaims and Jury Demand of Defendant Quantum to Complaint For Patent Infringement dated May 6, 2003.

Defendant Quantum's First Supplemental Response to Plaintiff Storage Technology's Interrogatory No. 4.

Defendant Quantum's Second Supplemental Response to Plaintiff Storage Technology's Interrogatory No. 4.

Expert Report of Arthur Moore regarding Invalidity of the '363 and '529 Patents dated Dec. 13, 2004.

Expert Report of James Lemke regarding Invalidity of the '363 and '529 Patents dated Dec. 13, 2004.

Supplemental Expert of James Lemke regarding invalidity of the '363 and '529 Patents dated Dec. 20, 2004.

Expert Report of Jimmy Godwin regarding Invalidity of the '363 and '529 Patents dated Dec. 13, 2004.

Defendant Quantum's Notice to Storage Technology Pursuant to 35 U.S.C. 282 dated Feb. 18, 2005.

Amendment in U.S. Appl. No. 10/346,197 dated Dec. 7, 2004.

Office Action in U.S. Appl. No. 10/346,197 dated Feb. 7, 2005.

* cited by examiner

Fig. 4(a)
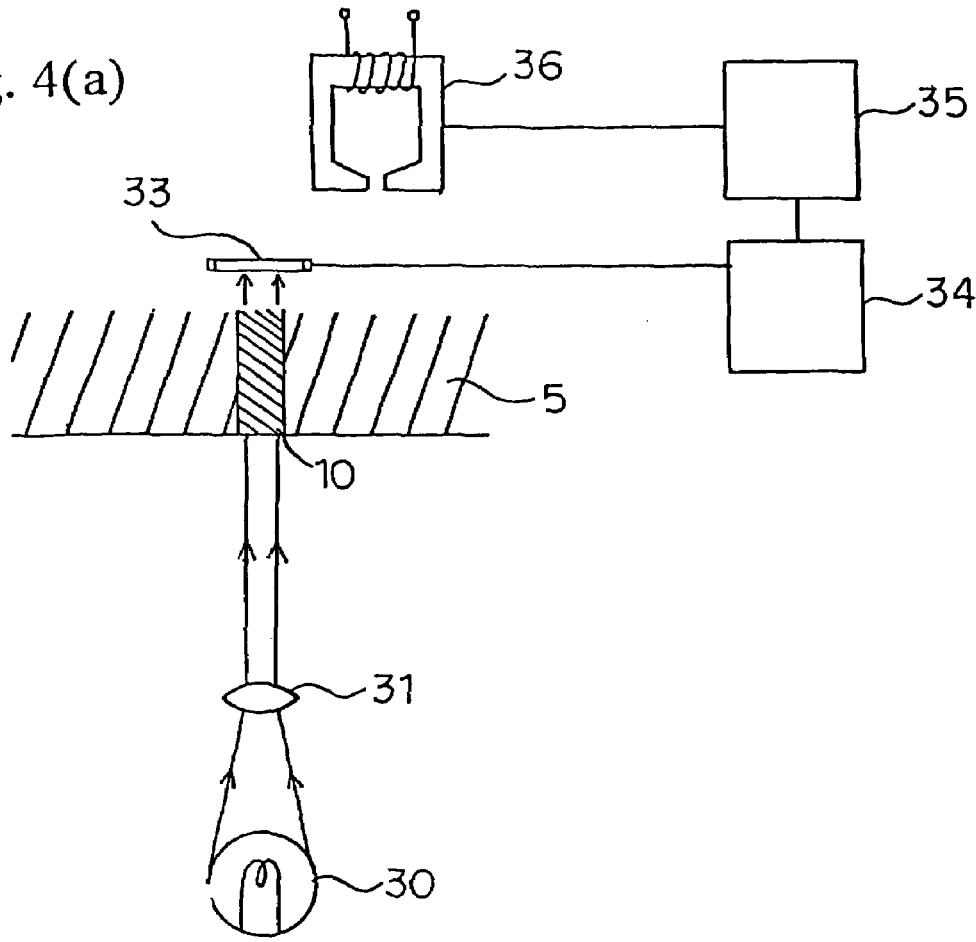
Fig. 4(b)    Fig. 4(c)    Fig. 4(d)
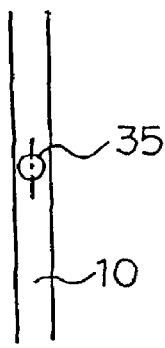
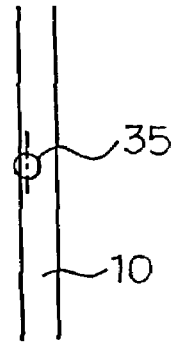
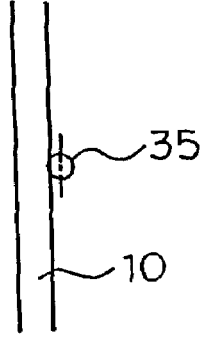

MAGNETIC TAPE

This application is a continuation and claims the benefit of priority under 35 USC 120 of U.S. application Ser. No. 10/341,739, filed Jan. 14, 2003, now abandoned, U.S. application Ser. No. 10/170,830, filed Jun. 13, 2002, now abandoned, and U.S. application Ser. No. 09/530,005, filed Jul. 21, 2000, now abandoned. In addition, this application claims the benefit of priority under 35 U.S.C. 119 of: 371 PCT/JP98/04767, filed Oct. 21, 1998, which claims the benefit of Japanese Application Number 9-289885, filed Oct. 22, 1997.

TECHNICAL FIELD

The present invention relates to magnetic tape having optical servo tracks. More particularly, it relates to magnetic tape having optical servo tracks on the side opposite to the magnetic recording side.

BACKGROUND ART

The recent expanding scale of the computer network and the importance of security for data management have been increasing the demand for magnetic tape having an increased recording capacity for use as a medium for data backup. Approaches to high recording capacity are divided into improvement on recording density and extension of the tape length.

Since the tape length that can be put in a tape cartridge as wound is the upper limit of the recording capacity, extension of the tape length for increasing the recording capacity cannot be achieved but by reducing the tape thickness. Therefore, an increase in recording capacity attained by this approach is of necessity limited. With respect to the method of increasing a recording density, it is known that magnetic tape has a lower recording density than a hard disc drive. Serpentine type magnetic tape particularly has a low recording density, which is due to the low track density. On the other hand helical scan type magnetic tape is known to have a higher track density than the serpentine type magnetic tape. This is because the magnetic tape of helical scan type uses a servo tracking system called automatic track finding (ATF).

A servo tracking system has also been adopted to serpentine type magnetic tape to improve the track density. Methods that have been proposed as such a servo tracking system include an embedded servo system, in which servo signals are written on the same track as the data track on the magnetic recording surface, and a system in which a track exclusive to servo signals is provided on the magnetic recording surface. Japanese Patent Publication No. 82626/95 proposes a tracking system particularly useful where the pitch of data tracks is as small as several tens of microns, in which a dedicated track for servo information is provided on the magnetic recording surface, and a plurality of servo signal reproduction heads are used to read the servo signals for tracking. According to this technique, however, the number of servo signal reproduction heads must be increased as the number of tracks increases. In order to avoid this, the servo track should be increased. Like this, conventional servo tracking systems use the same side of magnetic tape as used for data recording, which results in reduction of the data recording area. This problem is conspicuous in the servo tracking system of Japanese Patent Publn. No. 82626/95 when a track density is as high as about 30 tpmm (tracks per mm) or even more.

DISCLOSURE OF THE INVENTION

Accordingly, an object of the present invention is to provide magnetic tape which is capable of servo tracking without reducing the data area.

Another object of the present invention is to provide magnetic tape having an increased track density.

Still another object of the present invention is to provide magnetic tape having a high recording capacity.

As a result of extensive investigation, the inventors of the present invention have found that magnetic tape accomplishing the above objects can be obtained by incorporating specific fine particles into the backcoating layer of the magnetic tape and forming specific voids in the backcoating layer to make the backcoating layer capable of forming servo tracks.

Completed based on the above finding, the present invention accomplished the above objects by providing magnetic tape comprising a substrate, a magnetic layer provided on one side of the substrate and a backcoating layer provided on the other side of the substrate, wherein the backcoating layer comprises a binder and fine particles having been dispersed in the binder and being capable of irreversibly changing in color on oxidation reaction, and has a sufficient number of microvoids of sufficient size to supply sufficient oxygen to cause the oxidation reaction.

BRIEF DESCRIPTION OF THE DRAWINGS

Various other objects, features and attendant advantages of the present invention will be better understood from the following description and the accompanying drawings, in which like reference characters designate like parts and wherein:

FIGS. 4(a), 4(b), 4(c), and 4(d) schematically illustrate a method for carrying out servo tracking by a push-pull method.

BEST MODE FOR CARRYING OUT THE INVENTION

Figure 1:
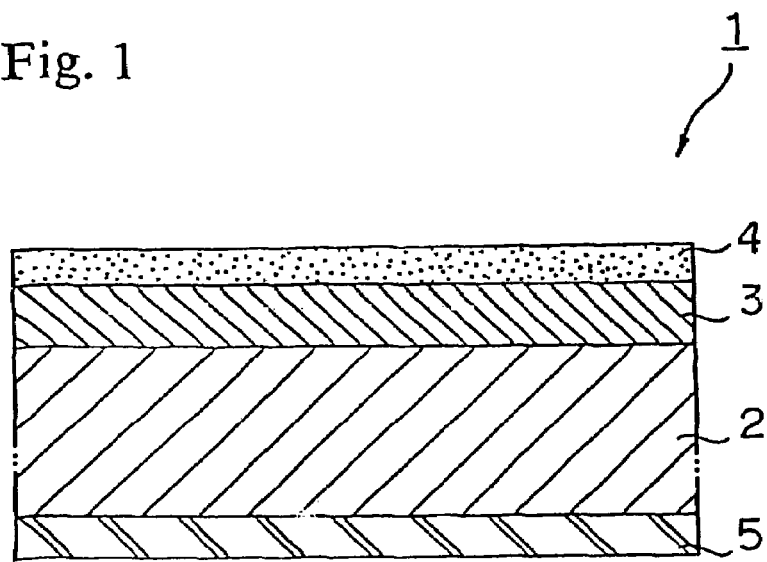
FIG. 1 is a schematic view showing the structure of one embodiment of the magnetic tape according to the present invention.
Figure 2:
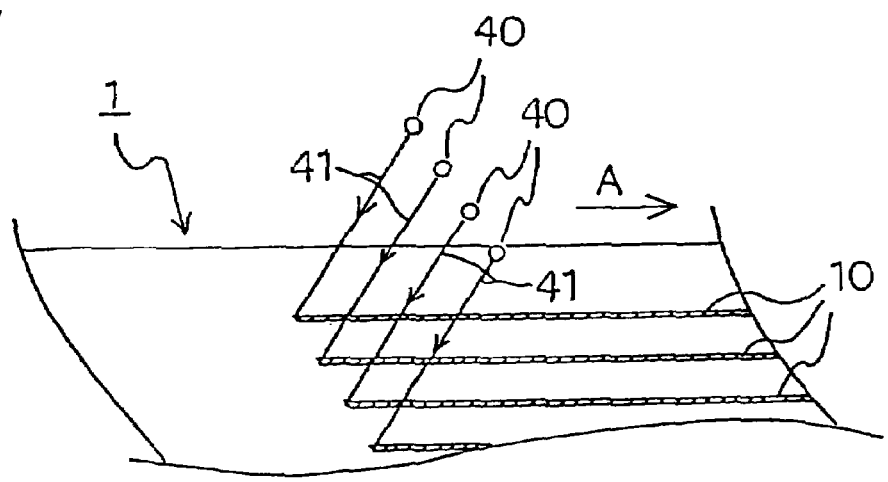
FIG. 2 schematically illustrates a method for forming a color change pattern by irradiating a backcoating layer with light beams.
Figure 3:
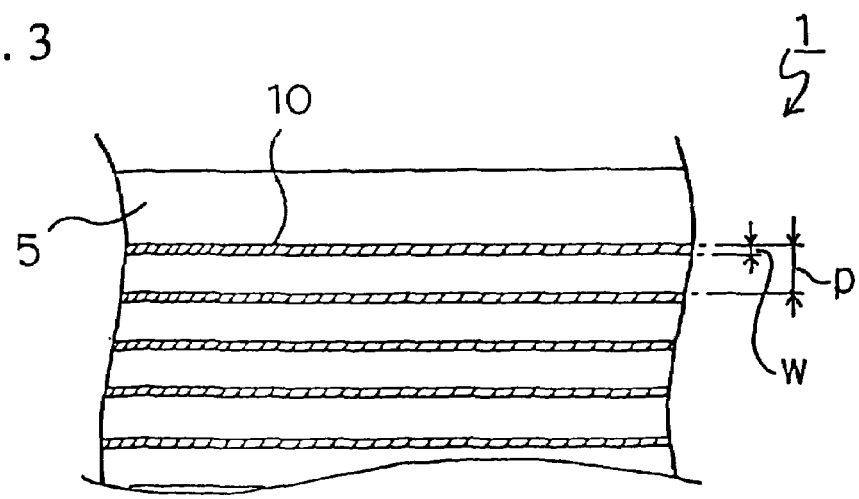
FIG. 3 is an enlarged partial view of the backcoating layer irradiated with light beams.

The magnetic tape of the present invention will be described with reference to the preferred embodiments thereof by referring to the accompanying drawings, in which FIG. 1 is a schematic view showing the structure of an embodiment of the magnetic tape according to the present invention, FIG. 2 schematically illustrates a method for forming a color change pattern by irradiating a backcoating layer with light beams, and FIG. 3 is an enlarged partial plane view of the backcoating layer irradiated with light beams.

Magnetic tape 1 of the embodiment shown in FIG. 1 comprises a substrate 2 having provided thereon an intermediate layer 3 and a magnetic layer 4 as a top layer adjoining the intermediate layer 3. The substrate 2 has on the other side a backcoating layer 5.

The magnetic tape 1 shown in FIG. 1 is used for a serpentine recording system. The magnetic layer 4 has a plurality of data tracks in parallel with the running direction of the magnetic tape 1. On use, a head unit having a predetermined number of magnetic heads is moved across the magnetic tape 1, switching among data tracks, to record or reproduce data on the data track corresponding to each magnetic head. Servo tracking is carried out so that each magnetic head may be positioned on a right data track on switching among the tracks or during recording or reproduction.

The backcoating layer 5 is formed of a binder having dispersed therein fine particles that change its color irreversibly on being oxidized. Oxidation reaction of the fine particles can be induced by affording energy necessary for the reaction. While the method of affording energy is not particularly limited, a method in which energy can be given only to a specific small area is preferably used. Such a method includes irradiation with a light beam, such as a laser beam.

The manner of irradiating the backcoating layer 5 with a light beam to oxidize the fine particles is explained by referring to FIG. 2.

As shown in FIG. 2, a plurality of laser beams 41 are emitted in parallel from the respective laser light sources 40 aligned at prescribed intervals across the width direction of the magnetic tape 1 and illuminate the backcoating layer 5 of the magnetic tape 1 running in direction A at a predetermined speed. The fine particles present in the parts irradiated with the laser beams 41 undergo oxidation reaction with oxygen present in air and change in color. The irradiation conditions with the laser beams 41 are controlled so that the color change may occur over the whole thickness of the irradiated part of the backcoating layer 5. The color change provides a prescribed color change pattern 10 in the backcoating layer 5. The color change pattern formed in this particular embodiment is comprised of a plurality of continuous lines of prescribed width along the longitudinal direction of the magnetic tape 1 as illustrated in FIG. 2. The width w of each line of the color change pattern 10 and the degree of color change in the thickness direction of the backcoating layer 5 can be adjusted by controlling the beam diameter and output of the laser beams 41. In this embodiment, the beam diameter is preferably 0.25 to 30 µm, particularly 1 to 25 µm, and the output is preferably 0.02 to 2 W, particularly 0.02 to 0.5 W. The color change pattern 10 in FIG. 2 is magnified.

FIG. 3 is referred to for going into details of the color change pattern thus formed. The color change pattern 10 is comprised of straight lines having a prescribed width w, arrayed in parallel to each other in the longitudinal direction of the magnetic tape 1 and spaced equally in the width direction of the magnetic tape 1. The color change pattern 10 is formed over the whole length of the magnetic tape 1. The color change pattern 10 is such that makes an optical contrast so that servo tracking for the data tracks on the magnetic layer 4 may be carried out based on the optical information provided from the color change pattern 10. As stated above, while the data tracks on the magnetic layer 4 are also formed in parallel to the longitudinal direction of the magnetic tape 1 similarly to the color change pattern 10, the relative positional relationship between the data tracks and the color change pattern 10 is not particularly limited.

The optical contrast made by the above-described color change pattern 10 includes a contrast of intensity of transmitted light when light of prescribed wavelength is incident on the color change pattern 10 and a contrast of intensity of reflected light when light of prescribed wavelength is incident on the color change pattern 10.

Where the contrast of transmitted light intensity is used for servo tracking, the intensity of transmitted light is detected to conduct servo tracking by an optical servo system, such as a push-pull method or a three-beam method. In using the contrast of reflected light intensity, the intensity of reflected light is detected to carry out servo tracking by the above-described servo system in the similar manner. The optical servo systems, such as a push-pull method and a three-beam method, are techniques commonly employed for achieving servo tracking in various optical discs.

Servo tracking based on the detected intensity of transmitted light by, for example, a push-pull method is described by referring to FIG. 4. As shown in FIG. 4(a), light is emitted from a light source 30, such as a semiconductor laser, which is placed to face the backcoating layer 5 of the magnetic tape running in the direction perpendicular to the surface of the paper, condensed through a lens 31 to a prescribed beam diameter, and enters the color change pattern 10 formed on the backcoating layer 5. The beam diameter is slightly smaller than the line width of the color change pattern 10. The intensity of the light having been transmitted through the color change pattern 10, the substrate 2 (not shown), the intermediate layer 3 (not shown), and the magnetic layer 4 (not shown), i.e., transmitted light is detected by a light detector 33. The transmitted light intensity is converted to electrical signals and sent to a servo tracking processor 34. The symmetry of the transmitted light beam intensity is processed in the servo tracking processor 34. If the beam intensity displays bilateral symmetry about the center line of the beam, it means that the beam 35 is incident on the center line of the color change pattern 10 as shown in FIG. 4(b). This state is an "on-track" state, that is, the magnetic head is properly positioned on an aimed data track of the magnetic layer. If the beam intensity lacks bilateral symmetry about the center line of the beam, it indicates that the beam 35 is deviating from the center line to either left or right as shown in FIG. 4(c) or (d). This state is an "off-track" state, that is, the magnetic head is not properly positioned on the data track of the magnetic layer. Then the servo tracking processor 34 gives a drive 35 of the magnetic head 36 instructions to move the magnetic head 36 to a proper position as shown in FIG. 4(a). As a result, the magnetic head 36 is properly positioned by the drive 35 to restore the "on-track" state.

As shown in FIG. 3, the line width w of the color change pattern 10 is preferably 0.25 to 50 µm. If the line width w is smaller than 0.25 µm, optical detection of the color change pattern may be disturbed because it is difficult with the state-of-the-art technique to condense the beam sufficiently. If the line width w exceeds 50 µm, the density of the color change pattern 10 unfavorably decreases where the pattern is comprised of a large number of lines as illustrated in FIG. 3. Therefore, the above-described range is preferred. A still preferred line width w of the color change pattern 10 is 0.25 to 30 µm, particularly 0.8 to 25 µm. In the present invention, it is preferred to use transmitted light for servo tracking. In that case, it is preferred for the whole magnetic tape before color change (the magnetic layer, the intermediate layer, the substrate, and the backcoating layer as a whole) has a light transmission of 15 to 40% for servo tracking.

While depending on the number of the lines forming the color change pattern 10, it is preferred that the pitch p of the color change pattern 10, i.e., the pitch of the adjacent color change lines be not less than the width of the data track formed on the magnetic layer 4 and be an integral multiple of the width of the data track.

The color change pattern 10 may be arranged over the whole width of the magnetic tape 1 at prescribed intervals as shown in FIG. 3, or in part of the width of the magnetic tape 10. For example, a plurality of lines spaced at prescribed intervals may be arranged in the central portion or either one of side portions of the tape in the width direction. Further, a plurality of lines spaced at prescribed intervals may be arranged in two or more portions of the magnetic tape 10 in the width direction. For example, two groups of lines (each group consists of at least one line, and the groups may consist of the same or different number of lines) can be arranged on each side portion of the tape; two groups of lines (each group consists of at least one line, and the groups may consist of the same or different number of lines) can be arranged on the central portion and one of the side portions of the tape; or three groups of lines (each group consists of at least one line, and the groups may consist of the same or different number of lines) can be arranged on the central portion and each side portion of the tape. In any case, the total number of the lines making up the color change pattern 10 is preferably a measure of the number of the data tracks of the magnetic layer 4.

The backcoating layer 5 has microvoids the number and the size of which are sufficient for supplying sufficient amount of oxygen to induce oxidation reaction of the above-described fine particles. Oxygen is supplied through the microvoids to the whole thickness of the backcoating layer 5 thereby making the fine particles undergo sufficient oxidation reaction. As a result, there is formed a color change pattern 10 providing sufficient optical contrasts. The microvoids may be either open pores exposed on the surface of the backcoating layer 5 or closed pores which exist inside the backcoating layer 5 and are not exposed on the surface. However, if there are too many closed pores, the amounts of various particles such as the above-described fine particles and a binder per unit volume are reduced relatively, which tends to make the contrasts of the color change pattern insufficient or make the film strength of the backcoating layer 5 insufficient. Accordingly, it is preferred that the microvoids are open pores or most of the microvoids are open pores. As long as the contrasts of the color change pattern and the film strength of the backcoating layer 5 retain sufficient levels, it is not at all problematical that the microvoids exist in a closed state.

Microvoids can be formed in the backcoating layer 5 by controlling the weight ratio of the total amount of various particles hereinafter described (i.e., the total amount of all inorganic particles contained in the backcoating layer 5) to the total resinous content including a binder, a hardener, etc. (hereinafter referred to as P/B ratio). A preferred P/B ratio is 100/10 (=10) to 100/30 (=3.33), particularly 100/14 (=7.14) to 100/25 (=4). With the P/B ratio of the backcoating layer 5 being within this range, it is possible to form microvoids preferably having a diameter of 1 to 20 nm, particularly 2 to 15 nm, and a void volume (volumetric ratio of the microvoids in the volume of the backcoating layer 5) of 5 to 40% by volume, particularly 10 to 35% by volume.

The diameter and volume of the microvoids are measured by a nitrogen adsorption method according to the following procedure.

A high-precision automatic gas adsorption apparatus "BELSORP 36" manufactured by Nippon Bell K.K. is used as measuring equipment.

A piece measuring about 100 cm$^2$ is taken out of a magnetic tape having only the backcoating layer side left on the substrate (i.e., a magnetic tape from which the magnetic layer 4 and the intermediate layer 3 have been removed), which was used as a sample of measurement. The sample is sealed into a sample tube. Nitrogen having a purity of 99.9999% and helium having a purity of 99.99999% are used as an adsorbing gas and a carrier gas, respectively.

The sample is allowed to stand at room temperature for 1 hour (reached degree of vacuum: 0.2 to 0.4 Pa) prior to the measurement, and then measurement is made at an adsorption temperature of 77 K. The measurement mode is an isothermal adsorption-desorption mode. The measuring range is from 0.00 to 0.99 in terms of relative pressure ($P/P_0$), and the equilibrating time is 300 seconds for every relative pressure.

The distribution of the measured void diameters is calculated by a DH (Dollimore & Heal) method and smoothed. Prior to the measurement of the sample, measurement is made on graphite carbon available from NPL (National Physical Laboratory), an international standard sample (proof value: 11.1 m$^2$/g; $\sigma$=0.8 m$^2$/g), to confirm that the precision and accuracy of measurement are within 2% and within 5%, respectively. No voids are present in the substrate.

The terminology "(void) diameter" as used herein means the void diameter at which the distribution curve obtained from the measurement of void diameter reaches the maximum peak (the highest frequency in the distribution curve).

The "void volume" is a value obtained by dividing the total volume of the microvoids calculated by the above-described DH method by the volume of the backcoating layer (the product of the thickness and the area) and multiplying the quotient by 100.

The above-described fine particles are now described in detail.

Any fine particles that undergo irreversible color change on being oxidized can be used with no particular restriction. It is particularly preferred to use metal oxides for their readiness to discoloration and the color contrast produced by the discoloration. The metal oxides include, for example, $FeO_x$ (1.34<x<1.5), TiO, SnO, MnO, and $Cr_2O_3$. It is particularly preferred to use $FeO_x$ for its satisfactory discoloration properties.

$FeO_x$ is iron oxide of magnetite type comprising divalent Fe and trivalent Fe. It is preferred for the $FeO_x$ to have a divalent Fe content of 5 to 24% by weight, especially 10 to 20% by weight, based on the total $FeO_x$.

The fine particles preferably have a primary particle size of 1 to 200 nm, particularly 5 to 80 nm, from the viewpoint of the surface smoothness of the backcoating layer. For the consideration of the above-mentioned P/B ratio, it is preferred that the fine particles be present in an amount of 300 to 1200 parts by weight, particularly 350 to 1000 parts by wight, per 100 parts by weight of the binder. More specifically, where the amount of the fine particles is less than 300 parts by weight, the sensitivity to color change tends to be insufficient for obtaining optically sufficient contrasts. If it exceeds 1200 parts by weight, the coating film of the backcoating layer tends to have reduced strength. Therefore, the above-described range is preferred.

Any binders can be used with no restriction as long as applicable to magnetic tape. For example, thermoplastic resins, thermosetting resins, reactive resins, and mixtures thereof can be used. Specific examples are vinyl chloride copolymers or modified vinyl chloride copolymers, copolymers comprising acrylic acid, methacrylic acid or esters thereof acrylonitrile copolymers (rubbery resins), polyester resins, polyurethane resins, epoxy resins, cellulosic resins, and polyamide resins. These binders preferably have a number average molecular weight of 2,000 to 200,000. The binder resin can have a polarizing functional group (so-called polar group), such as a hydroxyl group, a carboxyl group or a salt thereof, sulfoxyl group or a salt thereof a phosphate group or a salt thereof a nitro group, a nitric ester group, an acetyl group, a sulfuric ester group or a salt thereof, an epoxy group, a nitrile group, a carbonyl group, an amino group, an alkylamino group, an alkylammonium salt group, and a betaine structure, such as sulfobetaine or carbobetaine, to have improved dispersing properties for various particles which are incorporated into the backcoating layer 5.

While the backcoating layer 5 in the magnetic tape 1 serves to form color change pattern used for servo tracking as mentioned above, it is a matter of course that it should have the functions essential to a backcoating layer. Such functions include (1) providing magnetic tape with satisfactory running properties, (2) providing magnetic tape with antistatic properties, and (3) detecting the beginning (BOT) and the end (EOT) of the tape.

To perform the function (1), it is preferred for the backcoating layer 5 to have a moderate surface roughness. On the other hand, it is preferred for the backcoating layer 5 to be as smooth as possible to prevent the surface profile of the backcoating layer 5 from being transferred to the magnetic layer while the tape is wound. Taking the balance between these requirements into consideration, the backcoating layer 5 preferably has an arithmetic mean roughness Ra of 7 to 50 nm, particularly 8 to 30 nm, and a 10 point mean roughness Rz of 40 to 250 nm, particularly 50 to 200 nm.

The arithmetic mean roughness Ra, defined by the following equation (i), was measured with a stylus-type profilometer under the following conditions in accordance with JIS-B0601-1994.

| Stylus: | diameter: 1.5 to 2.5 µm; curvature: 60° |
| --- | --- |
| Contact pressure: | 50 to 300 µN |
| Cut-off length: | 80 µm |
| Sampling length: | 80 µm |
| Assessment length: | 400 µm |

$$Ra = \frac{1}{l}\int_0^l |y(x)|dx \quad (i)$$

wherein Y represents profile data; and l represents an assessment length.

In carrying out the measurement, a sample piece is stuck to a slide glass for microscopes which satisfies the requirements specified in JIS-R-3502 (while, in the present invention, a slide glass produced by Matsunami Glass K.K. was used, usable slide glass is not limited thereto) with water or ethanol. Existence of excessive water or ethanol will ruin the reproducibility of measurements. Therefore, the results obtained after the water or ethanol evaporates to some extent and while an interference fringe can be seen from the back of the slide glass are taken as Ra.

The 10 point mean roughness Rz, being defined by the following equation (ii), was obtained under the same conditions as for the measurement of Ra in accordance with JIS-0601-1994. The sample piece was the same as used for Ra; the sampling length l was 80 µm, and the assessment length $l_0$ was 400 µm.

$$Rz = \frac{|Y_{p1} + Y_{p2} + Y_{p3} + Y_{p4} + Y_{p5}| + |Y_{v1} + Y_{v2} + Y_{v3} + Y_{v4} + Y_{v5}|}{5} \quad (ii)$$

wherein $Y_{p1}$, $Y_{p2}$, $Y_{p3}$, $Y_{p4}$ and $Y_{p5}$ are heights of the five highest peaks within the sampled section corresponding to the sampling length l; and $Y_{v1}$, $Y_{v2}$, $Y_{v3}$, $Y_{v4}$ and $Y_{v5}$ are height of the five lowest valleys within the sampled section corresponding to the sampling length l.

In order for the backcoating layer 5 to have the arithmetic mean roughness Ra and the 10 point mean roughness Rz within the above-specified respective preferred ranges, it is preferable for the backcoating layer 5 to contain carbon black having a primary particle size of 15 to 80 nm, a BET specific surface area of 10 to 80 m²/g, and a DBP oil absorption of 100 to 300 cm³/100 g. It is still preferred for the carbon black to have a primary particle size of 25 to 80 nm, a BET specific surface area of 15 to 70, and a DBP oil absorption of 120 to 250 cm³/100 g.

The carbon black is preferably incorporated in an amount of 0.1 to 5parts by weight, particularly 0.1 to 3 parts by weight, per 100 parts by weight of the binder, which is effective for obtaining the above-described preferred P/B ratio and the above-described preferred arithmetic mean roughness Ra and 10 point mean roughness Rz of the backcoating layer 5.

Carbon black is known to have high light shielding properties. If carbon black is added to the backcoating layer 5 in a large quantity, the layer will have high light shielding properties and may fail to transmit sufficient light, which is unfavorable where transmitted light is made use of for servo tracking. Such being the case, it is a preferred manipulation to incorporate, into the backcoating layer 5, silicone resin particles whose primary particle size is smaller than the thickness of the backcoating layer 5 in place, of or in combination with, the carbon black, thereby to achieve the function (1). The silicone resin particles preferably have a primary particle size of 10 to 500 nm, particularly 10 to 300 nm. Silicone resin particles which can be used suitably include, for example, alkyl-modified silicone resins (resin particles having siloxane bonds extending in three dimensions to form a network structure in the inside thereof, and having the terminals of the network structure, i.e., the surface of the particles, modified with an alkyl). The silicone resin particles are preferably incorporated in an amount of 0.05 to 10 parts by weight, particularly 0.1 to 5 parts by weight, per 100 parts by weight of the binder, irrespective of whether the silicone resin particles are used alone or in combination with the carbon black, which range is preferred for obtaining the above-described preferred P/B ratio and the above-described preferred arithmetic mean roughness Ra and 10 point mean roughness Rz of the backcoating layer 5.

To perform the function (2), it is preferred for the backcoating layer 5 to contain an electrically conductive substance. Although the above-mentioned carbon black is a typical example of such a substance, incorporation of a large amount of carbon black into the backcoating layer 5 results in increased light shielding properties, and sufficient light cannot be transmitted as stated above in cases where transmitted light is used for servo tracking. This being the case, it is a preferred embodiment to use electrically conductive inorganic particles in place of, or in combination with carbon black thereby to obtain the function (2). The electrically conductive inorganic particles include those described in Japanese Patent Laid-Open No. 236541/94, col.

3, ll. 42–45, such as tin oxide, titanium dioxide, zinc oxide, indium oxide, zinc sulfide, barium sulfate, silicon oxide, and magnesium carbonate. These electrically conductive inorganic particles are generally white, assuring high light transmitting properties, which affords another advantage where transmitted light is utilized for servo tracking. Especially preferred electrically conductive inorganic particles are tin oxide, antimony-doped tin oxide (ATO), indium-doped tin oxide (ITO), and indium oxide. These electrically conductive inorganic particles preferably have a primary particle size of 1 to 100 nm, particularly 2 to 100 nm, especially 5 to 50 nm. These electrically conductive inorganic particles are preferably added in an amount of 5 to 100 parts by weight, particularly 10 to 80 parts by weight, per 100 parts by weight of the above-described fine particles irrespective of whether the electrically conductive inorganic particles are used alone or in combination with the carbon black, which range is preferred for obtaining the above-described preferred P/B ratio and for sufficiently performing the function (2).

In the magnetic tape according to the present invention, the function (3) can be performed substitutionally by the color change pattern 10. EOT or BOT has conventionally been detected by a light transmission method so that it has been essential for the backcoating layer 5 to contain carbon black. Incorporation of carbon black for detection of EOT or BOT is unnecessary in the present invention. This offers an extreme advantage where transmitted light is used for servo tracking.

The backcoating layer 5 can contain a lubricant, a hardener, and the like in addition to the aforementioned components.

Fatty acids and fatty acid esters are commonly used as a lubricant.

Examples of the fatty acids are caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid.

Examples of the fatty acid esters are alkyl esters of the above-enumerated fatty acids, with those having 16 to 46 carbon atoms in total being preferred.

Inorganic acid esters, such as phosphoric esters, are also useful as a lubricant.

The lubricant is added in an amount of 0.05 to 15 parts by weight, preferably 0.2 to 10 parts by weight, per 100 parts by weight of the binder.

The hardeners to be used generally include isocyanate hardeners, exemplified by "Coronate L" (a trade name, produced by Nippon Polyurethane Industry Co., Ltd.) and amine hardeners. The hardener is added in an amount of 5 to 30 parts by weight, preferably 5 to 20 parts by weight, per 100 parts by weight of the binder.

The backcoating layer 5 is formed by coating the substrate 2 with a backcoating composition having the above-mentioned components dispersed in a solvent. The solvents include ketone solvents, ester solvents, ether solvents, aromatic hydrocarbon solvents, and chlorinated hydrocarbon solvents. The solvent is preferably used in such an amount that the backcoating composition may have a solids content of 10 to 50% by weight, particularly 20 to 40% by weight.

The thickness of the backcoating layer 5, formed by applying the backcoating composition, is preferably 0.1 to 1.5 μm, still preferably 0.2 to 0.8 μm, taking into consideration the light transmission of the color change pattern 10 and the thickness balance with the magnetic layer 4 and the intermediate layer 3, and the like.

The backcoating layer 5 shown in FIG. 3 has a color change pattern 10 of a plurality of lines along the longitudinal direction of the magnetic tape 1. In place of such a pattern, a color change pattern of a single continuous straight line may be formed on the backcoating layer 5 along the longitudinal direction of the magnetic tape 1. The pattern to be formed on the backcoating layer 5 may be a single or a plurality of continuous sine curves along the longitudinal direction of the magnetic tape 1. Further, the pattern 10 can be comprised of discontinuous pieces of lines along the longitudinal direction of the magnetic tape 1 as shown in FIG. 5.

Figure 5:
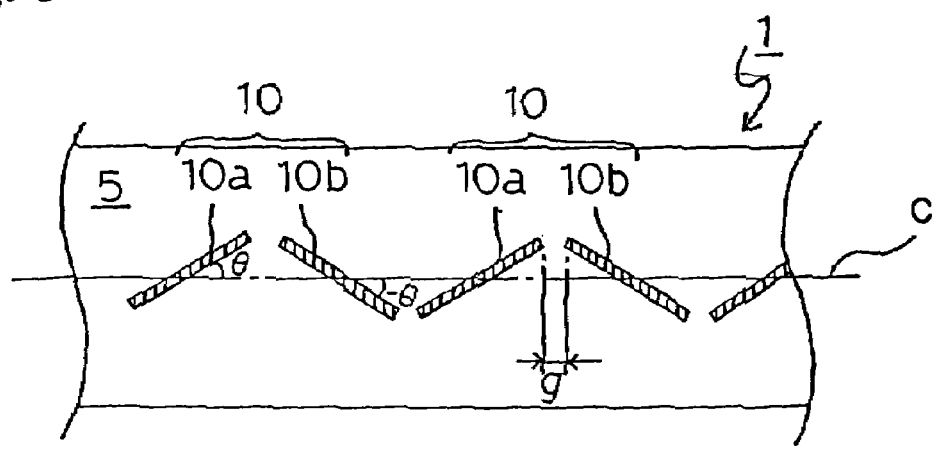
FIG. 5 schematically shows another color change pattern (corresponding to FIG. 3).

The color change pattern 10 shown in FIG. 5 is described below. The color change pattern 10 is made up of pieces 10a angled at θ° with the longitudinal direction of the magnetic tape 1 and pieces 10b angled at −θ°, which alternate with each other along the centerline c of the magnetic tape 1. The angle θ has an influence on the accuracy of positioning by servo tracking. A preferred angle θ for securing sufficient accuracy of positioning is 5 to 85°, particularly 10 to 30°. The lengths of the pieces 10a and 10b may be the same or different but are preferably the same. A preferred length of the pieces 10a and 10b is 5 to 140 mm, particularly 5 to 80 mm. The spacing between the piece 10a and the piece 10b, in terms of the interval g along the longitudinal direction of the magnetic tape 1, is preferably as narrow as possible. Servo tracking based on the color change pattern 10 shown in FIG. 5 can be carried out in the same manner as in the case of using the color change pattern 10 shown in FIG. 3.

General particulars concerning the magnetic tape according to the present invention are described hereunder.

The magnetic layer 4 of the magnetic tape 1 shown in FIG. 1 is formed by applying a magnetic coating composition comprising ferromagnetic powder and a binder. Namely, the magnetic tape 1 is particulate magnetic tape.

The ferromagnetic powder which can be used include acicular or spindle-shaped ferromagnetic powder and tabular ferromagnetic powder. Acicular or spindle-shaped ferromagnetic powder includes ferromagnetic metal powder mainly comprising iron and ferromagnetic iron oxide powder, and tabular ferromagnetic powder includes ferromagnetic hexagonal ferrite powder.

More specifically, the ferromagnetic metal powder includes powder having a metal content of 50% by weight or more, 50% by weight or more of the metal content being iron. Specific examples of such ferromagnetic metal powders include Fe—Co, Fe—Ni Fe—Al, Fe—Ni—Al, Fe—Co—Ni, Fe—Ni—Al—Zn, and Fe—Al—Si. The ferromagnetic iron oxide powder includes γ-$Fe_2O_3$, Co-doped γ-$Fe_2O_3$, and Co-doped $FeO_x$ ($4/3 \leq x < 1.5$). The acicular or spindle-shaped ferromagnetic powder preferably has a major axis length of 0.03 to 0.2 μm, particularly 0.05 to 0.16 μm, with an acicular ratio (major axis length/minor axis length) of 3 to 15, particularly 3 to 10. The acicular or spindle-shaped ferromagnetic powder preferably has a coercive force (Hc) of 125 to 200 kA/m, particularly 135 to 190 kA/m, and a saturation magnetization (σs) of 119 to 167 $Am^2/kg$, particularly 127 to 152 $Am^2/kg$. Further, the BET specific surface area of the acicular ferromagnetic powder is preferably 30 to 70 $m^2/g$, particularly 40 to 70 $m^2/g$.

The ferromagnetic hexagonal ferrite powder includes fine tabular particles of barium ferrite or strontium ferrite, part of the Fe atoms of which may be displaced with Ti, Co, Ni, Zn, V or the like atoms. The ferromagnetic hexagonal ferrite powder preferably has a tabular diameter of 0.1 μm or smaller, particularly 10 to 90 nm, especially 10 to 40 nm, and an aspect ratio (diameter/thickness) of 2 to 7, particularly 2 to 5. It preferably has a coercive force (Hc) of 135 to 260 kA/m and a saturation magnetization ($\sigma$s) of 27 to 72 $Am^2$/kg, particularly 43 to 72 $Am^2$/kg. Further, the ferromagnetic hexagonal ferrite powder preferably has a BET specific surface area of 30 to 70 $m^2$/g.

If necessary, the ferromagnetic powder can contain rare earth elements or transition metal elements. The ferromagnetic powder can be subjected to a surface treatment to improve dispersibility and the like. The surface treatment can usually be performed by a method similar to the method for coating the surface of the ferromagnetic powder with an inorganic oxide. Inorganic oxides which can be used in this surface treatment include $Al_2O_3$, $SiO_2$, $TiO_2$, $ZrO_2$, $SnO_2$, $Sb_2O_3$, and ZnO. These inorganic oxides can be used either individually or as a mixture of two or more thereof. The surface treatment can also be carried out by an organic treatment, such as a silane coupling treatment, a titanium coupling treatment or an aluminum coupling treatment.

The binder to be used can be of those illustrated for the formation of the backcoating layer 5. While the details of the binder are not described here, the explanations given in relation to the backcoating layer 5 apply appropriately. The binder is preferably used in an amount of 10 to 40 parts by weight, particularly 15 to 25 parts by weight, per 100 parts by weight of the ferromagnetic powder.

The magnetic layer 4 can further contain abrasive grains, carbon black, lubricants, hardeners, etc. in addition to the aforementioned components.

The abrasive grains that are preferably used include particles of substances having a Mohs hardness of 7 or higher, such as alumina, silica, $ZrO_2$, and $Cr_2O_3$. From the standpoint of reduction in frictional coefficient during running and improvement in running durability, the abrasive grains preferably have a primary particle size of 0.03 to 0.6 μm, particularly 0.05 to 0.3 μm. The abrasive grains are preferably added in an amount of 2 to 20 parts by weight, particularly 3 to 15 parts by weight, per 100 parts by weight of the ferromagnetic powder.

The carbon black, lubricant, and hardener to be used can be of those useful for the formation of the backcoating layer 5. Therefore, the details of these components are not described here. The explanations given in relation to the backcoating layer 5 apply appropriately. The carbon black is preferably used in an amount of 0.1 to 10 parts by weight, particularly 0.1 to 5 parts by weight, per 100 parts by weight of the ferromagnetic powder. The lubricant is preferably used in an amount of 0.5 to 10 parts by weight, particularly 0.5 to 5 parts by weight, per 100 parts by weight of the ferromagnetic powder. The hardener is preferably used in an amount of 2 to 30 parts by weight, particularly 5 to 20 parts by weight, per 100 parts by weight of the binder.

If desired, the magnetic layer 4 can contain various additives customarily used in magnetic tape, such as dispersants, rust inhibitors, and antifungals, in addition to the above-described components.

The magnetic layer 4 is formed by applying a magnetic coating composition having the aforementioned components dispersed in a solvent on an intermediate layer 3. The solvent can be of those illustrated for use in the backcoating composition. The solvent is preferably used in an amount of 80 to 500 parts by weight, particularly 100 to 350 parts by weight, per 100 parts by weight of the ferromagnetic powder present in the magnetic coating composition.

The magnetic coating composition is prepared by, for example, preliminarily mixing the ferromagnetic powder and the binder together with a portion of the solvent in a Naughter mixer, etc., kneading the premixture in a continuous pressure kneader, a twin-screw kneading machine, etc., diluting the mixture with another portion of the solvent, followed by dispersing in a sand mill etc., adding to the dispersion additives, such as a lubricant, filtering the dispersion, and adding thereto the remainder of the solvent and a hardener.

The magnetic layer 4 formed of the above-described magnetic coating composition preferably has a coercive force of 119 to 280 kA/m, particularly 120 to 250 kA/m, especially 125 to 222 kA/m, to secure sufficient recording and reproducing characteristics. Further, the magnetic layer 4 preferably has a saturation flux density of 0.1 to 0.5 T, particularly 0.15 to 0.45 T.

For obtaining an improved S/N ratio and for preventing self-demagnetization, the thickness of the magnetic layer 3 is preferably 0.05 to 3 μm, still preferably 0.1 to 0.8 μm.

The intermediate layer 3 is explained below.

The intermediate layer 3 may be either a layer having magnetism or a nonmagnetic layer. Where the intermediate layer 3 is a layer having magnetism, it is a magnetic layer containing magnetic powder, which is formed by using a magnetic coating composition mainly comprising magnetic powder, nonmagnetic powder, a binder, and a solvent. Where, on the other hand, the intermediate layer 3 is a nonmagnetic layer, the intermediate layer 5 is formed by using a nonmagnetic coating composition mainly comprising nonmagnetic powder, a binder, and a solvent (these coating compositions will be inclusively referred to as an intermediate layer coating composition).

Ferromagnetic powder is preferably used as the magnetic powder. Either of hard magnetic powder and soft magnetic powder can be used preferably.

The hard magnetic powder includes the ferromagnetic hexagonal ferrite powder, ferromagnetic metal powder and ferromagnetic iron oxide powder which can be used in the magnetic layer 4. The details of these ferromagnetic powders, while not described here, are the same as the ferromagnetic powders used in the magnetic layer 4, and the explanations given thereto apply appropriately.

While the soft magnetic powder to be used is not particularly limited, magnetic powder generally used in so-called low-current devices, such as a magnetic head and an electron circuit, are preferred. For example, the soft magnetic materials described in Chikazumi Toshinobu, "Kyojiseitai no Buturi (2nd Vol.) Jikitokusei to Ohyo", pp. 368–376, Shokabo (1984) can be used. Specifically, soft magnetic oxide powder and soft magnetic metal powder can be used.

Spinel type ferrite powder is preferably used as the soft magnetic oxide powder. The spinel type ferrite powder includes $MnFe_2O_4$, $Fe_3O_4$, $CoFe_2O_4$, $NiFe_2O_4$, $MgFe_2O_4$, $Li_{0.5}Fe_{2.5}O_4$, Mn—Zn type ferrite, Ni—Zn type ferrite, Ni—Cu type ferrite, Cu—Zn type ferrite, Mg—Zn type ferrite, Li—Zn type ferrite, Zn type ferrite, and Mn type ferrite. These soft magnetic oxide powders may be used either individually or as a combination of two or more thereof.

The soft magnetic metal powder includes Fe—Si alloys, Fe—Al alloys (e.g., Alperm, Alfenol and Alfer), Permalloy (e.g., Ni—Fe binary alloys or multinary alloys composed of the Ni—Fe binary system and Mo, Cu, Cr, etc.), Sendust (Fe—Si(9.6 wt %)-Al(5.4 wt %)), and Fe—Co alloys. These soft magnetic metal powders may be used either individually or as a combination of two or more thereof.

The soft magnetic oxide powder usually has a coercive force of 8 to 12000 A/m and a saturation magnetization of 30 to 90 Am$^2$/kg. The soft magnetic metal powder usually has a coercive force of 1.6 to 8000 A/m and a saturation magnetization of 5 to 500 Am$^2$/kg.

While not limiting, the shape of the soft magnetic powders include a spherical shape, a tabular shape, and an acicular shape. The size of the particles is preferably 5 to 800 nm.

If desired, the above-described magnetic powder can contain rare earth elements or transition metal elements similarly to the ferromagnetic powder contained in the magnetic layer 4. Further, the same surface treatment as could be given to the ferromagnetic metal powder may be effected.

The aforementioned nonmagnetic powder is explained. The nonmagnetic powder includes particles of nonmagnetic iron oxide (red oxide), barium sulfate, zinc sulfide, magnesium carbonate, calcium carbonate, calcium oxide, zinc oxide, magnesium oxide, magnesium dioxide, tungsten disulfide, molybdenum disulfide, boron nitride, tin dioxide, silicon carbide, cerium oxide, corundum, artificial diamond, garnet, siliceous stone, silicon nitride, molybdenum carbide, boron carbide, tungsten carbide, titanium carbide, diatomaceous earth, dolomite, and resins. Preferred of them are nonmagnetic iron oxide (red oxide), titanium oxide, and boron nitride. These nonmagnetic powders can be used either individually or as a combination of two or more thereof. The nonmagnetic particles may have any of a spherical shape, a tabular shape, and an acicular shape or may be amorphous. Spherical, tabular, and amorphous particles preferably have a particle size of 5 to 200 μnm, and acicular particles preferably have a major axis length of 20 to 300 nm with an acicular ratio of 3 to 20. Where the nonmagnetic powder is used in combination with the magnetic powder (i.e., where the intermediate layer 3 is a magnetic layer), the nonmagnetic powder is preferably used in an amount of 30 to 70 parts by weight, particularly 40 to 60 parts by weight, per 100 parts by weight of the magnetic powder. Where, on the other hand, the magnetic powder is not used (i.e., where the intermediate layer 3 is a nonmagnetic layer), the amounts of the other components are decided based on 100 parts by weight of the nonmagnetic powder. If necessary, the above-mentioned various nonmagnetic powders can be subjected to the same surface treatment as could be done on the magnetic powder.

The intermediate layer 3, either magnetic or nonmagnetic, can contain a binder in addition to the above-mentioned components and may further contain abrasive grains, lubricants, carbon black, hardeners, and so forth. While not described specifically, these components can be of those useful in the backcoating layer 5 and magnetic layer 4. Preferred amounts of these components are shown below, given in terms of parts by weight per 100 parts by weight of the total amount of the magnetic powder and the nonmagnetic powder (where the intermediate layer 3 is a magnetic layer) or 100 parts by weight of the nonmagnetic powder (where the intermediate layer 3 is a nonmagnetic layer).

| | |
|---|---|
| Binder: | 8 to 40 parts by weight, particularly 10 to 25 parts by weight |
| Abrasive grains: | 1 to 30 parts by weight, particularly 1 to 12 parts by weight |
| Lubricant: | 0.5 to 20 parts by weight, particularly 1 to 7 parts by weight |
| Carbon black: | 0.5 to 30 parts by weight, particularly 2 to 10 parts by weight |
| Hardener: | 0.5 to 12 parts, particularly 2 to 8 parts by weight |

If desired, the intermediate layer 3 can contain the additives as could be added to the magnetic layer 4.

The intermediate layer 3 is formed by coating the substrate 2 with an intermediate layer coating composition containing the aforementioned components and a solvent. The solvent may be of those used in the backcoating composition and the magnetic coating composition. The amount of the solvent to be used is preferably 100 to 700 parts by weight, particularly 300 to 500 parts by weight, per 100 parts by weight of the total of the magnetic powder and the nonmagnetic powder (where the intermediate layer 3 is a magnetic layer) or 100 parts by weight of the nonmagnetic powder (where the intermediate layer 3 is a nonmagnetic layer).

The intermediate layer 3 should have some thickness to control the capacity of holding lubricants which is influential on the durability of the magnetic tape 1, but too large a thickness is liable to cause crack initiation when deflected. Accordingly, a preferred thickness is 0.5 to 10 μm, particularly 0.1 to 3 μm.

Where the intermediate layer 3 is a layer having magnetism, its coercive force preferably ranges from 80 to 350 kA/m, particularly 150 to 300 kA/m, from the standpoint of overwrite characteristics and the output balance over a low to high frequency region. Its saturation flux density is preferably 0.02 to 0.1 T, particularly 0.03 to 0.09 T because too high a saturation flux density can result in deterioration of the overwrite characteristics, which leads to increased noise, and too low a saturation flux density can result in insufficient output.

Materials constituting the substrate 2 are nonmagnetic materials including polymers, such as polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamide; polyimide; polycarbonate; polysulfone; polyether ether ketone; and polyurethane. These materials can be used individually or in combination of two or more thereof. If necessary, the substrate made of these materials can be subjected to uniaxial or biaxial stretching, a corona discharge treatment, a treatment for improving adhesion, and the like.

The thickness of the substrate 2 is not particularly limited. It is preferably 2 to 100 μm, still preferably 2 to 76 μm.

The outline of a preferred process for producing the magnetic tape 1 shown in FIG. 1 is described below.

A magnetic coating composition for forming the magnetic layer 4 and an intermediate layer coating composition for forming the intermediate layer 3 are applied simultaneously to the substrate 2 in a wet-on-wet coating system to provide coating layers corresponding to the magnetic layer 4 and the intermediate layer 3 having respective prescribed thicknesses. That is, the magnetic layer 4 is preferably provided while the intermediate layer 3 is wet.

The coating layers are then subjected to magnetic field orientation, dried, and wound. Thereafter, the coated material is calendered, and a backcoating layer 5 is formed. Alternatively, formation of the intermediate layer 3 and the magnetic layer 4 may be preceded by formation of the backcoating layer 5. The coated material is aged at 40 to 80° C. for 6 to 100 hours and then slit to a prescribed width. A color change pattern 10 is then formed on the backcoating layer 5 in accordance with the aforementioned method.

The simultaneous coating technique in a wet-on-wet coating system is described in Japanese Patent Laid-Open No. 73883/93, column 42, line 31 to column 43, line 31. This is a technique in which a magnetic coating composition is applied before an intermediate layer coating composition dries. This technique being followed, there is obtained magnetic tape which causes few dropouts and can cope with high-density recording, and the coating layers of the resulting magnetic tape have excellent durability.

The magnetic field orientation treatment is carried out before each coating composition dries. The treatment can be performed by applying a magnetic field of about 40 kA/m or higher, preferably about 80 to 800 kA/m, in parallel with the side coated with the magnetic coating composition or passing the coated material through a solenoid type magnet of about 80 to 800 kA/m while the magnetic coating composition is wet. By the magnetic field orientation treatment under such conditions, the ferromagnetic powder in the magnetic layer 4 are orientated in the longitudinal direction of the magnetic tape 1. For the purpose of inhibiting the thus orientated ferromagnetic powder from changing its orientation during the subsequent drying step, it is a preferred manipulation to apply warm air of 30 to 50° C. from above the magnetic layer 4 immediately before the magnetic field orientation treatment, whereby the coated material is dried preliminarily to have a controlled residual solvent content in each layer.

The drying of the coating layers is carried out by, for example, supplying gas heated to 30 to 120° C. The degree of drying can be controlled by adjusting the temperature and the feed rate of the gas.

The calendering is carried out by, for example, supercalendering comprising passing the coated film between two rolls, such as a combination of a metal roll and a cotton roll or a synthetic resin roll, or a pair of metal rolls. The calendering conditions are preferably 60 to 140° C. in temperature and 100 to 500 kg/cm in linear pressure.

In the production of the magnetic tape 1, the surface of the magnetic layer 4 can be subjected to a finishing step, such as burnishing or cleaning, according to necessity. It is also possible to apply the magnetic coating composition and the intermediate layer coating composition by a generally known successive coating technique.

While the magnetic tape of the present invention has been described based on the preferred embodiments thereof, it should be understood that the present invention is not deemed to be limited thereto, and various changes and modifications can be made therein without departing from the spirit and scope of the present invention.

For example, the color change pattern 10 in the foregoing embodiments may be a combination of a color change pattern 10 composed of one continuous line or a plurality of continuous lines having a prescribed width along the longitudinal direction of the magnetic tape 1 and a color change pattern 10 composed of discontinuous lines having a prescribed width arranged along the longitudinal direction of the magnetic tape 1.

The color change pattern 10 may be composed of dots arranged in a line or a curve or a combination thereof.

Further, the color change pattern 10 may comprise circles, ellipses or any other figures or an arbitrary combination thereof.

The magnetic tape 1 shown in FIG. 1 can have a primer layer between the substrate 2 and the intermediate layer 3 or the backcoating layer 5.

While the magnetic tape according to the above-described embodiments is of particulate type, the effects of the present invention can be produced equally when the present invention is applied to magnetic tape of metal-deposited type.

The present invention has been described and will be better understood from the following Examples. However, the Examples are given for illustrative purposes only, and the present invention is not construed as being limited thereto unless otherwise noted. In Examples and Comparative Examples, the viscosity of the backcoating compositions was adjusted by varying the amount of the solvent (methyl ethyl ketone:toluene:cyclohexanone=3:2:1) so that it may fall within ±30% of the viscosity of the backcoating composition of Example 1 (as measured with an E type viscometer at 100 rpm) taken as a standard. Unless otherwise specified, all the parts and percents are given by weight.

EXAMPLE 1

The following components except the hardener were kneaded in a kneader, dispersed in a stirrer, and further finely dispersed in a sand mill. The dispersion was filtered through a 1 µm filter, and finally, the hardener was added thereto to prepare a backcoating composition, a magnetic coating composition, and an intermediate layer coating composition having the respective formulations described below.

| Formulation of Backcoating Composition: | |
|---|---|
| $FeO_x$ (primary particle size: 32 nm; BET specific surface area: 52 m$^2$/g; coercive force: 10.3 kA/m (129 Oe); saturation magnetization: 85 Am$^2$/kg; divalent Fe content: 19.7%; x = 1.363) | 70 parts |
| Phosphoric ester (lubricant) (Phosphanol RE610 (trade name), produced by Toho Chemical Industry Co., Ltd.) | 2 parts |
| Carbon black (primary particle size: 54 nm; BET specific surface area: 32 m$^2$/g; DBP oil absorption: 180 cm$^3$/100 g) | 1 part |
| Indium-doped tin oxide (ITO) (primary particle size: 35 nm) | 30 parts |
| Polyurethane resin (binder) (number average molecular weight: 25000; sulfoxyl group content: 1.2 × 10$^{-4}$ mol/g; glass transition point: 45° C.) | 17 parts |
| Stearic acid (lubricant) | 1 part |
| Polyisocyante (hardener) (Coronate L (trade name) produced by Nippon Polyurethane Industry Co., Ltd.; solid content: 75%) | 4 parts |
| Methyl ethyl ketone (solvent) | 90 parts |
| Toluene (solvent) | 60 parts |
| Cyclohexanone (solvent) | 30 parts |
| Formulation of Magnetic Coating Composition: | |
| Acicular ferromagnetic metal powder mainly comprising iron (Fe:Co:Al:Y:Ba = 70:25:2:2:1 (by weight)) (major axis length: 0.07 µm; acicular ratio: 6; coercive force: 160 kA/m (2010 Oe); saturation magnetization: 142 Am$^2$/kg; specific surface area: 56 m$^2$/g; X-ray particle size: 0.014 µm) | 100 parts |
| Alumina (abrasive) (primary particle size: 0.15 µm) | 8 parts |
| Carbon black (antistatic agent) (primary particle size: 0.018 µm) | 0.5 part |
| Vinyl chloride copolymer (binder) (average degree of polymerization: 280; epoxy content: 1.2 wt %; sulfoxyl group content: 8 × 10$^{-5}$ equiv./g) | 10 parts |
| Polyurethane resin (binder) (number average molecular weight: 25000; sulfoxyl group content: 1.2 × 10$^{-4}$ equiv./g; glass transition point: 45° C.) | 7 parts |
| Stearic acid (lubricant) | 1.5 parts |
| 2-Ethylhexyl oleate (lubricant) | 2 parts |
| Polyisocyanate (hardener) (Coronate L (trade name), produced by Nippon Polyurethane Industry Co., Ltd.) | 5 parts |

-continued

| | |
|---|---|
| Methyl ethyl ketone | 120 parts |
| Toluene | 80 parts |
| Cyclohexanone | 40 parts |
| Formulation of Intermediate Layer Coating Composition: | |
| α-Fe$_2$O$_3$ (average particle size (major axis length): 0.12 µm; acicular ratio: 10; specific surface area: 48 m$^2$/g) | 100 parts |
| Alumina (abrasive) (primary particle size: 0.15 µm) | 3 parts |
| Vinyl chloride copolymer (binder) (average degree of polymerization: 280; epoxy content: 1.2 wt %; sulfoxyl group content: 8 × 10$^{-5}$ equiv./g) | 12 parts |
| Polyurethane resin (binder) (number average molecular weight: 25000; sulfoxyl group content: 1.2 × 10$^{-4}$ equiv./g; glass transition point: 45° C.) | 8 parts |
| Stearic acid (lubricant) | 1 part |
| 2-Ethylhexyl oleate (lubricant) | 4 parts |
| Polyisocyanate (hardener) (Coronate L (trade name), produced by Nippon Polyurethane Industry Co., Ltd.) | 4 parts |
| Methyl ethyl ketone | 90 parts |
| Toluene | 60 parts |
| Cyclohexanone | 30 parts |

The intermediate layer coating composition and the magnetic coating composition were applied simultaneously onto a 6 µm thick polyethylene terephthalate film substrate by means of a die coater to form the respective coating layers having a dry thickness of 1.5 µm and 0.2 µm, respectively. The coated film was passed through a solenoid type magnet of 400 kA/m while wet and then dried in a drying oven by applying hot air at 80° C. at a rate of 10 m/min. After the drying, the coated film was calendered to form an intermediate layer and a magnetic layer. Subsequently, the reverse side of the substrate was coated with the backcoating composition and dried at 90° C. to form a backcoating layer having a thickness of 0.5 µm. The magnetic tape stock thus obtained was slit to a width of 12.7 mm to obtain a magnetic tape. The magnetic layer of the resulting magnetic tape had a coercive force of 165 kA/m, a saturation flux density of 0.37 T, and a squareness ratio of 0.86. The arithmetic mean roughness Ra was 4.2 nm, and the 10 point mean roughness Rz was 38 nm.

As shown in FIG. 2, the backcoating layer of the resulting magnetic tape was irradiated with laser beams having a wavelength of 1.03 µm, an output of 0.3 W, and a beam diameter of 18 µm to form a color change pattern of a plurality of lines. The color change pattern thus formed was composed of a plurality of continuous straight lines extending in the longitudinal direction of the magnetic tape and equally spaced in the width direction of the magnetic tape.

EXAMPLE 2

A magnetic tape was obtained in the same manner as in Example 1, except for using carbon black having a primary particle size of 28 nm, a BET specific surface area of 70 m$^2$/g, and a DBP oil absorption of 50 cm$^3$/100 g as the carbon black in the backcoating composition used in Example 1. A color change pattern was formed on the backcoating layer of the magnetic tape in the same manner as in Example 1.

EXAMPLE 3

A magnetic tape was obtained in the same manner as in Example 1, except that the amount of the FeO$_x$ of the backcoating composition used in Example 1 was changed to 100 parts and that ITO was not incorporated. A color change pattern was formed on the backcoating layer of the magnetic tape in the same manner as in Example 1.

EXAMPLE 4

A magnetic tape was obtained in the same manner as in Example 1, except for replacing ITO of the backcoating composition used in Example 1 with Mn—Zn ferrite (primary particle size: 32 nm; BET specific surface area: 45 m$^2$/g; Fe$_2$O$_3$:MnO:ZnO=70:21:10). A color change pattern was formed on the backcoating layer of the magnetic tape in the same manner as in Example 1.

EXAMPLE 5

A magnetic tape was obtained in the same manner as in Example 1, except for replacing the carbon black of the backcoating composition used in Example 1 with 0.5 part of silicone resin particles (alkyl-modified silicone resin particles; primary particle size: 300 nm). A color change pattern was formed on the backcoating layer of the magnetic tape in the same manner as in Example 1.

Comparative Example 1

A magnetic tape was obtained in the same manner as in Example 1, except for replacing the FeO$_x$ of the backcoating composition used in Example 1 with α-Fe$_2$O$_3$ (average particle size (major axis length): 0.12 µm; aspect ratio: 10; specific surface area: 48 m$^2$/g). A color change pattern was formed on the backcoating layer of the magnetic tape in the same manner as in Example 1.

Comparative Example 2

A magnetic tape was obtained in the same manner as in Example 1, except for replacing 70 parts of FeO$_x$ of the backcoating composition used in Example 1 with 10 parts of carbon black (primary particle size: 28 nm; BET specific surface area: 70 m$^2$/g; DBP oil absorption: 50 cm$^3$/100 g). A color change pattern was formed on the backcoating layer of the magnetic tape in the same manner as in Example 1.

Comparative Example 3

A magnetic tape was obtained in the same manner as in Example 1, except for changing the amount of the polyurethane resin of the backcoating composition used in Example 1 to 50 parts. A color change pattern was formed on the backcoating layer of the magnetic tape in the same manner as in Example 1.

Comparative Example 4

A magnetic tape was obtained in the same manner as in Example 1, except for changing the amount of the polyurethane resin of the backcoating composition used in Example 1 to 10 parts. A color change pattern was formed on the backcoating layer of the magnetic tape in the same manner as in Example 1.

In order to evaluate the performance of the magnetic tapes obtained in Examples and Comparative Examples, the reproduction output of the magnetic tape, the arithmetic mean roughness Ra, 10 point mean roughness Rz, coefficient of dynamic friction, surface resistivity, void diameter, and void volume of the backcoating layer, and the light transmission and color change of the backcoating layer were measured. Further, the magnetic tape was subjected to a servo signal writing test. The results are shown in Table 1. The P/B ratio of the backcoating layer is also shown in Table 1. Of these measurements, the arithmetic mean roughness Ra, 10 point mean roughness Rz, void diameter and void volume of the backcoating layer were measured in accordance with the aforementioned methods. The other measurements were made according to the following methods.

Reproduction Output:

A head tester method was followed. Signals having a recording wavelength of 0.6 μm were recorded, and the incident light was obtained. The values shown in Table 1 are transmissions measured before the irradiation with a laser.

Color Change in Color Change Pattern Area:

The part irradiated with laser beams was observed with the naked eye and under an optical microscope.

Servo Tracking Test:

Signals were recorded on the magnetic layer of the magnetic tape for evaluation while carrying out servo tracking in accordance with a push-pull method. The servo signals were detected by converting the difference in light transmission at 1030 nm between a discolored part and a non-discolored part of the backcoating layer into electrical signals.

TABLE 1

|  | Backcoating Layer | | | | | | | Color Change Pattern | | |
| --- | --- | --- | --- | --- | --- | --- | --- | --- | --- | --- |
|  | Reproduction Output (dB) | Ra (nm) | Rz (nm) | Dynamic Friction Coefficient | Surface Resistivity (Ω/□) | Void Diameter (nm) | Void Volume (%) | P/B Ratio | Light Transmission*[1] (%) | Color Change | Servo Tracking Test |
| Ex. 1 | +0.6 | 11 | 85 | 0.21 | $4.2 \times 10^6$ | 5.6 | 28 | 5.05 | 24 | observed | OK |
| Ex. 2 | +0.3 | 9.4 | 58 | 0.42 | $5.1 \times 10^6$ | 4.7 | 27 | 5.05 | 26 | observed | OK |
| Ex. 3 | +0.4 | 8.6 | 81 | 0.28 | $7.3 \times 10^9$ | 5.2 | 32 | 5.05 | 21 | observed | OK |
| Ex. 4 | +0.2 | 9.1 | 71 | 0.26 | $4.7 \times 10^9$ | 6.6 | 26 | 5.05 | 18 | observed | OK |
| Ex. 5 | +0.3 | 10 | 87 | 0.23 | $4.6 \times 10^6$ | 6.0 | 28 | 5.03 | 27 | observed | OK |
| Comp. Ex. 1 | 0 (standard) | 8.8 | 76 | 0.28 | $\geq 10^{12}$ | 5.1 | 21 | 5.05 | 37 | not observed | NG |
| Comp. Ex. 2 | −0.2 | 17 | 122 | 0.20 | $6.3 \times 10^5$ | 7.3 | 39 | 2.05 | 16 | not observed | NG |
| Comp. Ex. 3 | +0.1 | 13 | 72 | 0.46 | $3.8 \times 10^9$ | 4.6 | 9.5 | 1.91 | 32 | not observed | NG |
| Comp. Ex. 4 | −0.3 | 34 | 215 | 0.27 | $5.6 \times 10^8$ | 8.3 | 44 | 7.77 | 18 | observed | NG*[2] |

*[1]Transmission before laser irradiation

*[2]Testing was impossible because the magnetic tape did not run sufficiently due to considerable dusting of the backcoating layer.

reproduction output was measured. The results obtained were expressed relatively taking Comparative Example 1 as a standard (0 dB).

Coefficient of Dynamic Friction (μ):

The magnetic tape was run on a tape tester TBT-300D manufactured by Yokohama System Kenkyusho K.K. at a speed of 3.36 cm/sec with its magnetic layer in contact with a cylinder having a diameter of 5 mm at 180°. The tensions on the reel-off side and the reel-up side were measured to obtain a frictional coefficient (μ) from equation (iii):

$$\mu = (1/\pi) \ln(\text{reel-off tension})/(\text{reel-up tension}) \quad (iii)$$

Surface Resistivity:

A pair of electrodes plated with 24-K. gold and finished to have a surface roughness of N4 (see ISO 1302) and having a radius of 10 mm were put in parallel horizontally on the magnetic layer with a center-to-center distance d=12.7 mm. A direct voltage of 100 V±10 V was applied to the electrodes while applying a force of 0.25 N to both ends of the magnetic tape, and the current between the electrodes was measured, from which the surface resistivity was obtained.

Light Transmission:

The magnetic tape was irradiated with monochromatic light having a wavelength of 900 nm, and the percent light transmission in terms of the ratio of transmitted light to As is apparent from the results shown in Table 1, the magnetic tapes of Examples (samples according to the present invention) are capable of reliable servo tracking without suffering from impairment of the functions essential to the backcoating layer. In particular, the magnetic tapes of Examples achieved reliable servo tracking even when the tapes were recorded on data tracks of 600 tpmm as demonstrated in Table 1.

INDUSTRIAL APPLICABILITY

As described in detail, the present invention provides magnetic tape which is capable of servo tracking without reducing the data area.

The present invention provides magnetic tape which is capable of servo tracking without suffering from impairment of the function essential to the backcoating layer.

The present invention provides magnetic tape having an improved track density.

The present invention provides magnetic tape having a high recording capacity.

It is apparent from the above teachings that various modifications can be made in the present invention. Accordingly, it should be understood that the invention can be practiced otherwise than as specifically described within the scope of the appended claims.

The invention claimed is:

1. Magnetic tape comprising a substrate, a magnetic layer provided on one side of said substrate and a backcoating layer provided on the other side of said substrate, wherein:
   said backcoating layer comprises a binder and particles having been dispersed in said binder and being capable of irreversibly changing in color on oxidation reaction, and has a sufficient number of microvoids of sufficient size to supply sufficient oxygen to cause said oxidation reaction.

2. Magnetic tape as claimed in claim 1, wherein said backcoating layer is to be irradiated with a light beam to cause oxidation of said particles whereby said particles undergo color change to form a color change pattern on the backcoating layer so that servo tracking of data tracks on said magnetic layer can be carried out based on the optical information provided from said color change pattern.

3. Magnetic tape as claimed in claim 1, wherein the void volume of said microvoids in said backcoating layer is 5 to 40% by volume.

4. Magnetic tape as claimed in claim 1, wherein said particles comprise a metal oxide having a primary particle size of 1 to 200 nm.

5. Magnetic tape as claimed in claim 4, wherein said metal oxide is selected from the group consisting of $FeO_x$ (1.34<x<1.5), TiO, SnO, MnO and $Cr_2O_3$.

6. Magnetic tape as claimed in claim 1, wherein said backcoating layer has an arithmetic mean roughness Ra of 7 to 50 nm and a 10 point mean roughness Rz of 40 to 250 nm.

7. Magnetic tape as claimed in claim 1, wherein said backcoating layer contains 0.1 to 5 parts by weight of carbon black per 100 parts by weight of said binder, said carbon black having a primary particle size of 15 to 80 nm, a BET specific surface area of 10 to 80 $m^2/g$, and a DBP oil absorption of 100 to 300 $cm^3/100$ g.

8. Magnetic tape as claimed in claim 1, wherein said backcoating layer contains 0.05 to 10 parts by weight of silicone resin particles having a primary particle size of 10 to 500 nm per 100 parts by weight of said binder.

9. Magnetic tape as claimed in claim 1, wherein said backcoating layer contains 5 to 100 parts by weight of electrically conductive inorganic particles having a primary particle size of 1 to 100 nm per 100 parts by weight of said fine particles.

10. Magnetic tape as claimed in claim 9, wherein said electrically conductive inorganic particles are selected from the group consisting of tin oxide, antimony-doped tin oxide, indium-doped tin oxide and indium oxide.

11. Magnetic tape as claimed in claim 1, wherein said color change pattern comprises a single or a plurality of continuous lines having a prescribed width along the longitudinal direction of the tape.

12. Magnetic tape as claimed in claim 1, wherein said color change pattern comprises discontinuous pieces of lines having a width along the longitudinal direction of the tape.

13. Magnetic tape as claimed in claim 1, wherein servo tracking is carried out by detecting reflected light of the light incident on said color change pattern.

14. Magnetic tape as claimed in claim 1, wherein servo tracking is carried out by detecting transmitted light of the light incident on said color change pattern.

15. Magnetic tape as claimed in claim 1, wherein at least one magnetic or nonmagnetic intermediate layer is provided between said substrate and said magnetic layer, and said magnetic layer comprises acicular or spindle-shaped ferromagnetic metal powder having a major axis length of 0.03 to 0.2 µm or tabular ferromagnetic hexagonal ferrite powder having a tabular diameter of 0.1 µm or smaller.

16. Magnetic tape comprising a substrate, a magnetic layer provided on one side of said substrate and a backcoating layer provided on the other side of said substrate, wherein:
   said backcoating layer comprises a binder and particles having been dispersed in said binder and being capable of irreversibly changing in color on oxidation reaction, and has a sufficient number of microvoids of sufficient size to supply sufficient oxygen to cause said oxidation reaction, and
   said particles have changed in color to form a color change pattern on said backcoating layer.

* * * * *